(12) United States Patent
Azuma (10) Patent No.: US 7,450,152 B2
(45) Date of Patent: Nov. 11, 2008

(54) DIGITAL CAMERA, CUSTOMER AUTHENTICATION COMMUNICATION TERMINAL EQUIPMENT, AND ENCODING SERVICE SYSTEM

(75) Inventor: Motoo Azuma, Tokorozawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 595 days.

(21) Appl. No.: 10/235,527

(22) Filed: Sep. 5, 2002

(65) Prior Publication Data

US 2003/0052975 A1    Mar. 20, 2003

(30) Foreign Application Priority Data

Sep. 6, 2001    (JP) ............. 2001-270659

(51) Int. Cl.
*H04N 5/225* (2006.01)
*H04N 9/04* (2006.01)
*H04N 5/228* (2006.01)
*G03B 15/00* (2006.01)
*G03B 17/02* (2006.01)

(52) U.S. Cl. ............... 348/207.99; 348/222.1; 396/2; 396/6

(58) Field of Classification Search ............. 396/2, 396/429, 6; 348/220.1, 231.1, 231.7, 231.9, 348/207.99; 711/115
See application file for complete search history.

(56) References Cited

U.S. PATENT DOCUMENTS

| 4,405,829 | A | * | 9/1983 | Rivest et al. ............. 380/30 |
| 5,153,730 | A | * | 10/1992 | Nagasaki et al. ......... 348/231.6 |
| 5,179,446 | A | * | 1/1993 | Hong .................... 348/333.07 |
| 5,499,294 | A | * | 3/1996 | Friedman ................. 713/179 |
| 5,623,637 | A | * | 4/1997 | Jones et al. .............. 711/164 |
| 5,862,217 | A |   | 1/1999 | Steinberg et al. |
| 5,862,218 | A |   | 1/1999 | Steinberg |
| 6,484,260 | B1 | * | 11/2002 | Scott et al. ............... 713/186 |
| 6,587,949 | B1 | * | 7/2003 | Steinberg ................. 713/193 |
| 6,628,326 | B1 | * | 9/2003 | Manico et al. ........... 348/211.12 |
| 6,644,455 | B2 | * | 11/2003 | Ichikawa ................. 194/205 |
| 6,968,058 | B1 | * | 11/2005 | Kondoh et al. ........... 380/200 |
| 7,013,288 | B1 | * | 3/2006 | Reifel et al. .............. 705/26 |
| 7,136,487 | B1 | * | 11/2006 | Schon et al. ............. 380/229 |
| 7,324,133 | B2 | * | 1/2008 | Steinberg et al. ......... 348/207.99 |
| 2001/0017652 | A1 | * | 8/2001 | Sato ..................... 348/207 |

(Continued)

FOREIGN PATENT DOCUMENTS

JP    09-200730 A    7/1997

(Continued)

*Primary Examiner*—David Ometz
*Assistant Examiner*—Richard M Bemben
(74) *Attorney, Agent, or Firm*—Fishauf, Holtz, Goodman & Chick, P.C.

(57) ABSTRACT

The digital camera comprises a photoelectric conversion part configured to perform a photoelectric conversion of a field image and output a first image signal, a first processing part configured to perform a first signal processing of the image signal and output a second image signal, an encoding part configured to encode the second image signal and output a third image signal, a second processing part configured to perform a second signal processing to the second image signal and output a fourth image signal, a first memory configured to memorize a customer ID information, a code key used in the encoding part, and the third image signal, and a second memory configured to memorize the fourth image signal.

13 Claims, 4 Drawing Sheets

U.S. PATENT DOCUMENTS

| | | | | |
|---|---|---|---|---|
| 2001/0030773 | A1* | 10/2001 | Matsuura et al. | 358/471 |
| 2002/0002503 | A1* | 1/2002 | Matsuoka | 705/26 |
| 2002/0054218 | A1* | 5/2002 | Kobayashi et al. | 348/220 |
| 2002/0060736 | A1* | 5/2002 | Wakao et al. | 348/207 |
| 2002/0167599 | A1* | 11/2002 | Carau | 348/231.9 |

FOREIGN PATENT DOCUMENTS

| | | |
|---|---|---|
| JP | 11-205738 A | 7/1999 |
| JP | 2000-196931 A | 7/2000 |
| JP | 2000-228740 A | 8/2000 |
| JP | 2001-22046 A | 8/2001 |

* cited by examiner

DIGITAL CAMERA, CUSTOMER AUTHENTICATION COMMUNICATION TERMINAL EQUIPMENT, AND ENCODING SERVICE SYSTEM

CROSS-REFERENCE TO RELATED APPLICATION

This application is based upon and claims the benefit of priority from the prior Japanese Patent Application No. 2001-270659, filed Sep. 6, 2001, the entire contents of which are incorporated herein by reference.

BACKGROUND OF THE INVENTION

1. Field of the Invention

The present invention relates to a digital camera, a customer authentication communication terminal equipment, and an encoded image service system. Specifically, the present invention relates to a system which manages a digital camera which photographs an encoded image and a customer who uses it, and, in addition, to a service system which processes an image signal photographed by the customer.

2. Description of the Related Art

The digital camera becomes widely spread instead of the silver film camera in recent years. However, the sales price of the digital camera is more expensive than that of the silver camera in general. For that, to achieve a further spread of the digital camera, the circulation system and the production system is disclosed. In this system, the digital camera to which the photographed image cannot be read is sold or is lent out cheaply and the main body of the digital camera is collected and the print service is performed as well as the film with the lens (see Jpn. Pat. Appln. KOKAI Publication No. 2000-228740). The digital camera has means for recording the photographed image in the memory fixed in the main body, and limiting the access from the external device of the digital camera to the memory. In addition, since the user cannot exchange or charge the battery, it is impossible to use the camera any more when the battery is finished. This system is a system which tries to establish the camera recycling system by depending on such limitations. It is necessary to collect the digital cameras to the service center in order to output the photographed image signal. Therefore, the time required until a print output of the photographed image and the electronic image data are obtained is the same level as the print service of a silver camera. Therefore, an acquisition of the image data and an immediacy of the print output which is the maximum feature of the digital camera are ruined very much.

On the other hand, it is extremely easy to make the reproduction of the digital image signal if the digital image signal photographed by the digital camera can be accessed. Then, to prevent the stranger from illegally reproducing the photograph digital image signal, the digital camera system which records the encoded image signal by an RSA encoding method which is one of asymmetric code is disclosed (see Jpn. Pat. Appln. KOKAI Publication No. 11-205738).

The digital camera consumes a lot of electric powers compared with the silver camera. Therefore, when the photographing is performed by carrying the digital camera to a long-term travel, it is necessary to carry the battery charger and/or a lot of exchange batteries.

Many owners of the digital camera have the personal computer device (Hereafter, called as a "PC"). It seems that, since the digital camera spreads rapidly, establishment of the peculiar service system to the digital camera such as postprocessing of the photographed image, the high picture quality prints, and the image data storage is late compared with that of the silver camera.

It seems that it becomes possible for the user who does not have the PC easily to use the digital camera by the method of Jpn. Pat. Appln. KOKAI Publication No. 2000-228740, and some of the above-mentioned problem can be solved.

However, since the user of the digital camera is not specified in the method of Jpn. Pat. Appln. KOKAI Publication No. 2000-228740, it is difficult to reclaim the digital camera. In addition, there is fear that the collected digital camera damages or is out of order. It is preferable to manufacture the digital camera cheaply to decrease such a risk as little as possible. However, it is difficult to obtain the photographed image with high picture quality by the recycling digital camera designed by cutting the manufacturing cost as low as possible. Recycle processing of the digital camera differs from simple recycling processing of the film with the lens, and in addition, needs a technical difficulty is high, and a large sum of running cost is required because of the preparation for expensive exchange parts etc. It is forecast that it is extremely difficult to set the price of the digital camera for recycling cheaply realistically from such a respect.

BRIEF SUMMARY OF THE INVENTION

An object of the present invention is to provide a digital camera suitable to apply to a rental system, especially a digital camera which generates an encoded image signal suitable to apply to the rental system and a customer authentication communication terminal equipment and to provide a service system which lends or sells the digital camera to registration customers cheaply, and charges surely according to the amount of use thereof.

The digital camera according to the first aspect of the present invention is characterized by comprising: a photoelectric conversion part configured to perform a photoelectric conversion of a field image and output a first image signal; a first processing part configured to perform a first signal processing of the image signal and output a second image signal; an encoding part configured to encode the second image signal and output a third image signal; a second processing part configured to perform a second signal processing to the second image signal and output a fourth image signal; a first memory configured to memorize a customer ID information, a code key used in the encoding part, and the third image signal; and a second memory configured to memorize the fourth image signal. The digital camera, which memorizes the encoded image signal which is an encoded photographed image signal and the output data from the second processing part to the memory, and encodes and records the photographed image signal, can be provided.

Preferable modes of the above-mentioned digital camera are as follows.

The following each mode may be applied solely or by combining properly.

(1) The first processing part performs a processing of compressing the image signal.

(2) The image signal is one of a static image, a moving image, and a voice signal or combination thereof.

(3) The second processing part performs a processing of reducing a size of the image signal.

(4) The first memory is an attachable and detachable storage medium.

(5) The second memory is an attachable and detachable storage medium which is the same as or different from the first storage medium.

(6) The second processing part includes a part which performs a conversion into a data format only for a predetermined device.

(7) The first memory or the second memory memorizes a number of scenes, which can be photographed, beforehand.

(8) The number of scenes which has been photographed is subtracted from a number of scenes which can be photographed memorized in the first memory or the second memory, and a subtraction result is re-recorded in the first memory or the second memory.

(9) The third image signal is transferred to an external device.

The encoded image service system according to the second aspect of the present invention is characterized by comprising: a receipt part configured to receive an encoded electronic image signal sent by a customer; a customer manager configured to manage a customer registration to the system and an account information to the registered customer; a coded image rendering part configured to decode the code of the encoded electronic image signal; a system encoding part configured to encode the electronic image signal to which the code is decoded, independently; and an image server part configured to perform at last one processing of a print output of the electronic image signal to which the code is decoded, and the storage and record of the image signal which is encoded independently according to a service demand of the customer. The encoded image service system, which decodes the encoding of the encoded electronic image signal sent from the customer, and performs the print output service and/or the storage service of another encoded image data, can be provided.

Preferable modes of the above-mentioned encoded image service system are as follows. The following each mode may be applied solely or by combining properly.

(1) The customer manager further includes: an information receipt part configured to receive a customer ID information, the encoded electronic image signal, and a demand service information; an authentication part configured to attest whether the customer has registered; and an account part configured to charge a user for a use charge corresponding to a content of a service demanded by the customer.

(2) The customer ID information is included in the first code key to decode the code of the encoded electronic image signal.

(3) The account part memorizes an individual information of the customer.

(4) The account part adds a predetermined amount of a use charge to an amount of an account to the customer for every predetermined use period and an addition result is memorized, again while contracting to the customer.

(5) The account part includes a time part configured to time a required time necessary to execute a demanded service from the customer and adds a predetermined use amount to the amount of the account to the registered user at each passage of the unit time during executing the demand service to memorize an addition result again.

(6) The account part includes a part configured to receive a service scene information from the customer, and adds an amount of a use charge corresponding to a number of service scenes to an amount of an account to the customer to memorize an addition result again.

(7) The receipt part includes a part configured to receive the encoded image signal and adds a charge according to a number of scenes of the encoded image signal to an amount of an account to the registered user to memorize it again.

(8) The coded image rendering part memorizes the first decode key group of two or more customers who can decode the encoded image signal.

(9) The customer manager creates a predetermined record medium memorizing a first code key which is registered to the customer manager by a customer registration and is possible to perform coding and registers a first decode key which can performing decoding corresponding to the first code key to the coded image rendering part.

(10) An image encoding part configured to encode the decoded image signal with the first code key or the second code key is further provided.

(11) The image encoding part includes a second code key memory memorizing the second code key set to each of a plurality of customers, and encodes the decoded image signal by the coded image rendering part using the second code key.

(12) The second decode key for decoding is created for each customer by the customer registration.

(13) The image server part memorizes the image signal encoded by the image encoding part.

The customer authentication communication terminal equipment according to the third aspect of the present invention is characterized by comprising: an information receipt part configured to receive a customer ID information, an encoded electronic image signal, and a demand service information which are transmitted by using a communication part, or transferred from an attachable and detachable nonvolatile memory; a communication part configured to communicate with the above-mentioned encoded image service system; and a customer authentication manager configured to attest a registration of a customer to the corresponding system. The customer authentication communication terminal equipment, which can be applied to the system to provide a service to the customer who communicates with the encoded image service system, can be provided.

Preferable modes of the above-mentioned customer authentication communication terminal equipment are as follows. The following each mode may be applied solely or by combining properly.

(1) A manager configured to manage a lending and return information of a digital camera prepared for lending I further provided.

(2) The customer authentication manager judges an authentication according to an information received from the encoded image service system.

(3) The customer authentication manager displays an account information received from the encoded image service system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
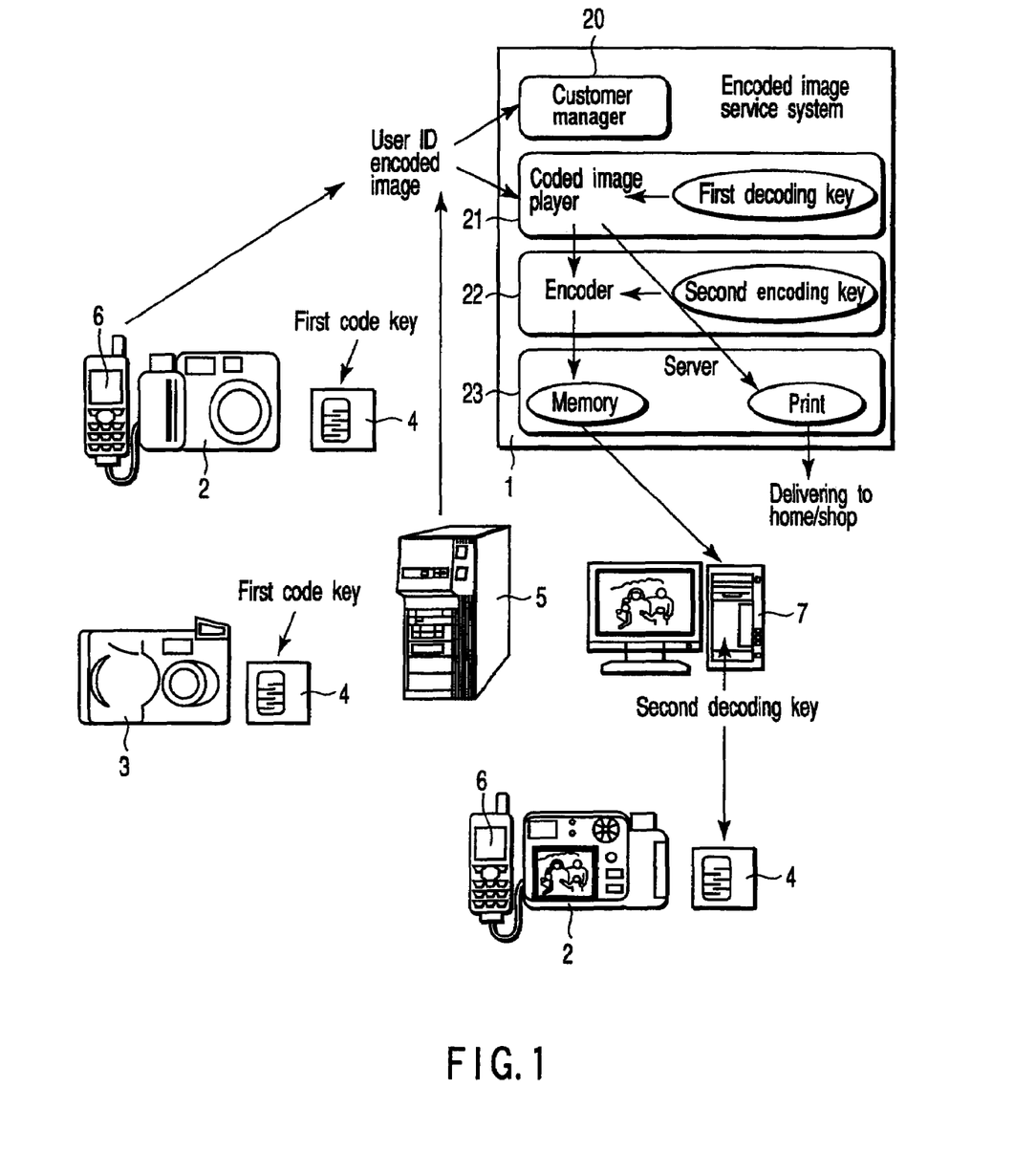
FIG. 1 is a conceptual diagram which shows a whole content of the encoding image service system according to the embodiment of the present invention.

Embodiments of the present invention will be explained referring to the drawings. FIG. 1 is a figure which shows a whole concept of the encoded image service system according to the present invention. FIG. 1 shows an appearance in which the encoded image photographed by the digital camera 2 (hereinafter, called as merely "camera", too) or the digital camera 3 is transmitted to the encoded image service system 1 (hereinafter, called as merely "system", too), and the image is transmitted to, for instance, the personal computer 7 possessed by the customer. The digital camera 2 (3), which is lent or sold, can encode the image according to the embodiment of the present invention in which details thereof will be described later. In FIG. 1, the customer authentication communication terminal equipment 5 is set up by, for instance, the agency on the sightseeing ground etc., and various services are given to the customer by communicating with the encoded image service system 1.

The function of the system according to the embodiment of the present invention in the above-mentioned configuration will be easily explained. In the encoded image service system, the encoded image signal recorded in the ID memory medium 4 which is an attachable and detachable nonvolatile memory is input to the service system 1 through the communication part 6 (Cable and the wireless are acceptable) or the customer authentication communication terminal equipment 5, and decoding processing is performed by the service system 1. The image signal decoded once is encoded again by the mode of which only the customer 8 who orders the service can decode, the print output is performed for instance, and is up-loaded on the server part 23. And, the account according to the use of various services is performed. Various processing such as the picture quality adjustments of the gamma adjustment and the white balance adjustment of the photographed image, etc., trims, the rotations, reversing, and the specified picture frame syntheses, etc. can be performed according to the demand of the customer 8. It is preferable that the content of the demand processing is recorded in the ID memory medium 4 as postprocessing information with the corresponding encoding image signal in this case.

For instance, the customer 8 who has the personal computer 7 can download and store the up-loaded image data in the memory of the personal computer 7 by accessing the server part 23 of the encoded image service system 1 through the communication part (not shown in the figure) connected with the personal computer 7. The downloaded data which is encoded can be decoded on the personal computer 7 by using the second decode key.

Even in an environment in which the personal computer 7 cannot be used, if there are the communication part 6 and the digital camera 2, it is possible to access the server part 23 of the encoded image service system 1 through the communication part 6, download the up-loaded image data to the digital camera 2, and store it in memory medium 4. In this case, as well as the above-mentioned case, the code can be decoded on the digital camera 2 with the second decode key.

By performing the print output service according to the demand of the customer 8, the customer 8 accepts the completed print at a storefront of a nearest service shop.

Or, it is possible to accept the completed print by mailing and delivering to home.

The service of mailing and delivering the record medium such as CDR to which an image data at the state that the second encoding is given and the step of decoding the code are written to the customer 8 can be carried out.

Figure 2:
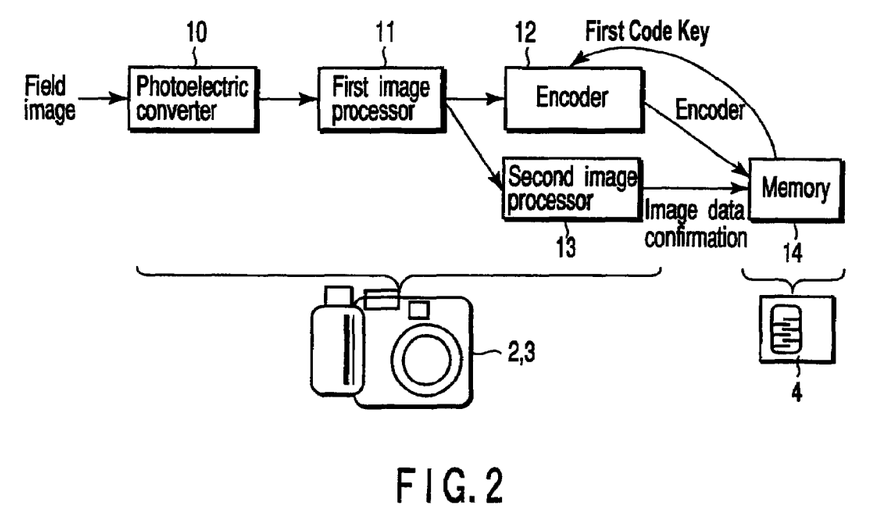
FIG. 2 is a block diagram which shows an example of the configuration of the digital camera according to the embodiment of the present invention.

FIG. 2 is a figure which shows a configuration of the digital camera 2 (3) applied to the encoded image service system of FIG. 1. In FIG. 2, the digital camera 2 (3) supplied for sales or for lending comprises a photoelectric conversion part 10, a first image processing part 11, an encoding part 12, a second image processing part 13 and a memory 14. The photoelectric conversion part 10 includes the imaging sensor and the front end processing circuit. The first image processing part 11 includes the data compression circuit. The encoding part 12 performs predetermined encoding processing based on the first code key. The second image processing part 13 receives the output from the first image processing part 10, and outputs data for the image confirmation. The memory 14 memorizes the image encoded in the encoding part 12 and the image processed in the second image processing part 13. In addition, the digital camera 2 (3) has the installation part (not shown in the figure) to install the ID memory medium 4 (Correspond to the memory 14) which is attachable and detachable memory memorizing the first code key and the customer ID information. The digital camera 2 (3) is configured so that it becomes possible to use if the ID memory medium 4 is installed.

Well-known various image processing is performed to the photographed image signal photographed by the digital camera 2 (3) in the first image processing part 11. Thereafter, the image signal is encoded by using the first code key read from the memory 14 by the encoding part 12. And, the encoded image signal is recorded in the memory 4, but the encoded image signal cannot be decoded by the corresponding digital camera 2 (3). Moreover, even if the digital camera 2 (3) is connected directly with an external equipment such as the personal computers 7, it is not possible to decode it.

However, in the digital camera, it is necessary to confirm the propriety of the photographed image in the scene. Therefore, by processing of the second image part 13, the image signal with minimum picture quality and image size for confirmation is made. And, the image signal for confirmation is associated with as the encoded image signal and recorded in the memory 14. The digital camera 2 (3) has the reading part where the image signal for confirmation is read from the memory 14, the display part where the read image signal for confirmation is displayed, and the part, which deletes unnecessary image data, as well as the digital camera usually used, but they are not shown in FIG. 2. Moreover, the image encoded in the encoding part 12 and the image processed in the second processing image part are memorized in the memory 14, in FIG. 2. It is not limited to this, and the image encoded in the encoding part 12 may be memorized in the memory 14 which is the attachable and detachable memory and the image processed in the second image processing part may be memorized in an internal memory which does not show in the figure. In this case, it is preferable to delete the image signal memorized in the internal memory when the memory 14 is detached from the camera.

The following means are effective to prohibit the rendering of the image signal for confirmation with the external equipments other than the digital camera 2 (3). That is, (1) The storage medium which has a special external shape is adopted.

(2) The image signal for confirmation is recorded by a special record format.

(3) The second memory which memorizes only the image for confirmation is arranged in the main body of the camera and cannot be read from the external device.

(4) The third encode key which can be encoded/decoded only with the corresponding digital camera and cannot be read from the external device is adopted. The third encode key may be set to all digital cameras of this model together or may be set individually in each main body of the digital camera.

Figure 3:
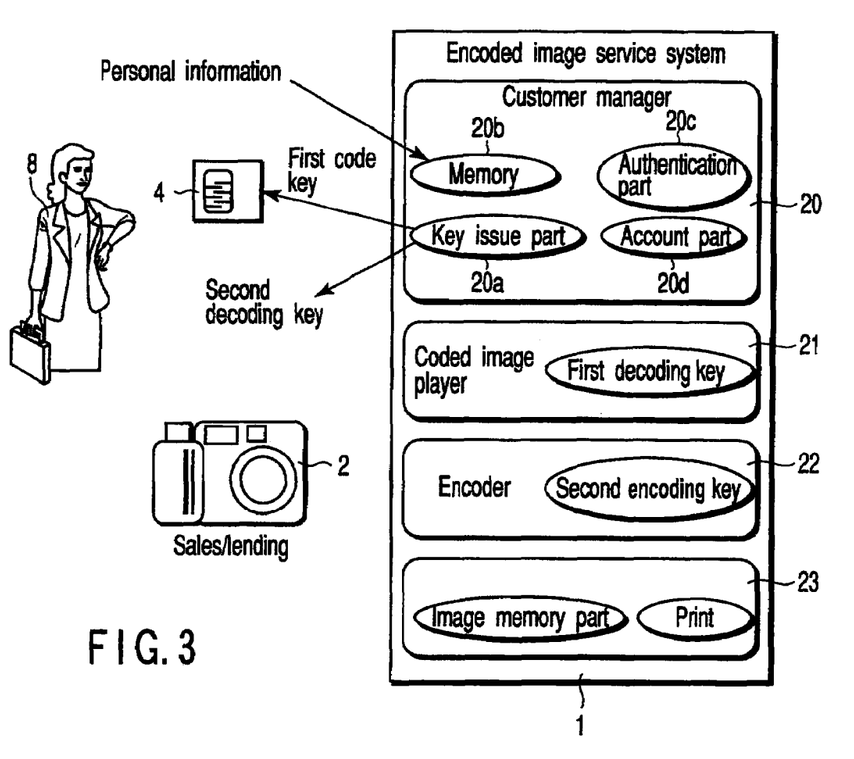
FIG. 3 is a conceptual figure which shows an outline of the encoded image service system central part according to the embodiment of the present invention.

FIG. 3 is a figure which shows an outline of the encoded image service system 1 as the above-mentioned digital camera 2 (3) is sold and/or lent out. The encoded image service system 1 has a customer management division 20, a code image restoration part 21, an encoding part 22, and a server part 23. The customer manager 20 contains a key issue part 20*a* where the code key and the decode key are issued, a memory 20*b*, an authentication part 20*c*, and an account part 20*d*. The coded image rendering part 21 decodes the encoded image signal sent from the customer 8. The encoding part 22 encodes the image signal decoded once again with a different format. The server part 23 stores, memorizes and/or print-outputs the image signal encoded in encoding part 22.

The customer 8 who hopes for use the encoded image service system 1 must perform customer registration, first. To perform the customer registration, the customer 8 inputs the individual information to the customer manager 20 of the encoded image service system 1 to specify the individual. The individual information demanded here contains individual information which is at least issued by public organizations of the driving license proof and the healthy insurance proof, etc. When the personal information is input, and the predetermined check of the data is ended, the key issue part 20*a* generates a customer ID information, a first code key, a first decode key, a second code key, and a second decode key at the same time as a data set for the customer. And, the encoded image service system 1 issues the ID memory medium 4 to which the customer ID information and the first code key are input and the second decode key to the corresponding customer 8. In addition, the encoded image service system 1 associates the first decode key and the second code key with the personal information of the corresponding customer 8 and stores them in the encoded image service system 1. When the customer registration is completed, the customer 8 can photograph by installing the accepted ID memory medium 4 in the above-mentioned digital camera 2 (3). Moreover, the ID memory medium 4 can contain the account information in addition to the individual information. However, the account is performed based on the latest data of the encoded image service system 1. Therefore, at the loss of the ID memory medium 4 etc., the ID memory medium 4 can be reissued any number of times and any number of ID memory mediums. It is needless to say that the customer personal information never flows out outside by the strict protection. In addition, to prevent the person who steals or finds stranger's ID memory medium 4 from misusing this (the camera is bought or is borrowed cheaply), the password number etc. may be used in addition to the customer ID information, may be used at the customer authentication, and the limitation may be added to the number of camera which can be bought or lent out.

Figure 4:
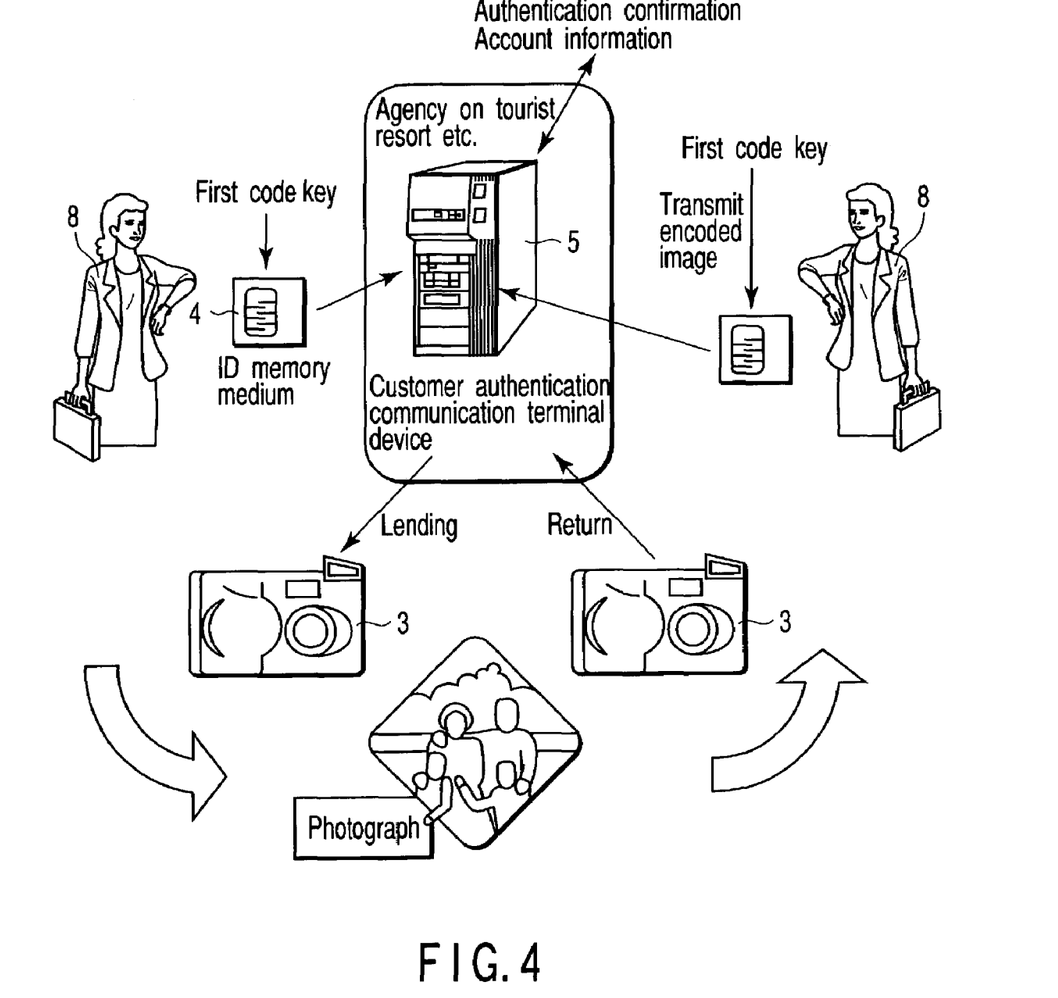
FIG. 4 is a conceptual diagram which shows an outline of service using the customer authentication communication terminal equipment according to the embodiment of the present invention.

FIG. 4 is a figure which shows an outline of the service system which uses the customer authentication communication terminal equipment 5 to a method (rental method) to lend out the above-mentioned digital camera 2 (3) from the agency on the sightseeing ground etc. as an application example. The customer authentication communication terminal equipment 5 and the digital camera 3 for lending are prepared at the place where a lot of chances of taking a picture such as the sightseeing ground and Wedding Halls exist etc., the station of the railway, and the service area in the expressway. The customer 8 performs the customer registration and obtains the ID memory medium 4 which memorizes the first code key beforehand. And, the customer 8 borrows the digital camera 3 for lending when going to the sightseeing ground etc., and installs the ID memory medium 4 which is possessed by the customer 8 in the digital camera 3 to photograph. And, when the use of the digital camera 3 is finished, the digital camera 3 is returned to the agency by detaching the ID memory medium 4 from the digital camera 3. By adopting such a lending method, the customer 8 can take a picture by borrowing the desired digital camera 3 if necessary on the sightseeing ground etc. if only the ID memory medium 4 is carried. In this case, for instance, it is effective that the camera is set as a high picture quality model in the Wedding Hall, telescope model in the sports watching and a light compact model in the tourist resort etc. Of course, as the rent of the digital camera in such a place, it is desirable that the desired model enables the reservation reception beforehand. Moreover, it is also possible to return it excluding the place borrowed by performing the communication of the lending record data of the digital camera 3 between the customer authentication communication terminal equipment 5 and the encoded image service system 1.

As mentioned-above, the customer 8 who uses the encoded image service system can use the best digital camera by borrowing the best digital camera only for a necessary period without bringing the digital camera in the scene according to the use purpose. On the other hand, it becomes easy to always use the latest model since the desired camera can be used. Moreover, it is preferable to receive various maintenance service such as which includes the operation confirmation, the battery charge or the exchange and a service which stores the corresponding image data on the server after the recorded digital image signal is transmitted and encoded. In this case, since these service use charges are the batch account method in the encoded image service system 1, the customer 8 needs neither cash nor the credit card.

In this lending method, the customer authentication communication terminal equipment 5 set up by the agency has the following functions. The customer authentication communication terminal equipment 5 is connected mutually through a well-known communication part such as above-mentioned encoding image service systems 1 and the pay phone lines and various work of the inquiry of the data of the customer authentication confirmation and account information, etc., the lending, the return information management of the digital camera 3, and the encoding image transmission from returned digital camera 3 to the system 1, etc. can be smoothly performed by the customer authentication communication terminal equipment 5.

Figure 5:
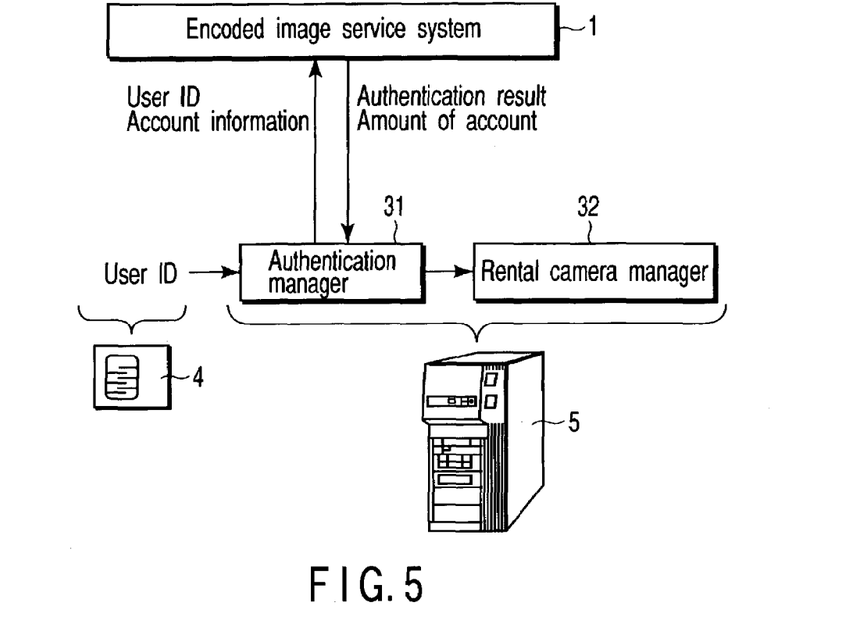
FIG. 5 is a conceptual diagram which shows an authentication/digital camera lending using the customer authentication communication terminal equipment according to the embodiment of the present invention.

FIG. 5 shows the procedure from the customer authentication to the lending of the digital camera 3 by using the above-mentioned customer authentication communication terminal equipment 5. The customer ID information is read from the corresponding ID memory medium 4 when the ID memory medium 4 that the customer 8 is brought is set in the ID memory medium reading part of the customer authentication communication terminal equipment 5 set up at the agency (not shown in the figure). The authentication management part 31 inside the customer authentication communication device 5 inquires the customer ID information of the encoded image service system 1. Then, the customer authentication result and the latest account data in case of the registered customer are sent back by the system 1. When it is confirmed that customer 8 is a registered customer, continuously, the digital camera 3 for lending is specified based on the hope model and the stock situation etc. of the digital camera 3 for lending and the digital camera 3 for lending is handed over to the customer 8. Lending date and the customer ID are input to lending camera manager 32 as the lending record data of the digital camera 3.

The reference data what model it is willingly used can be obtained in what place or at what time, by feeding back a part of this lending camera manage data to the system 1. Additionally, it becomes profitable information when a new service base is provided.

Figure 6:
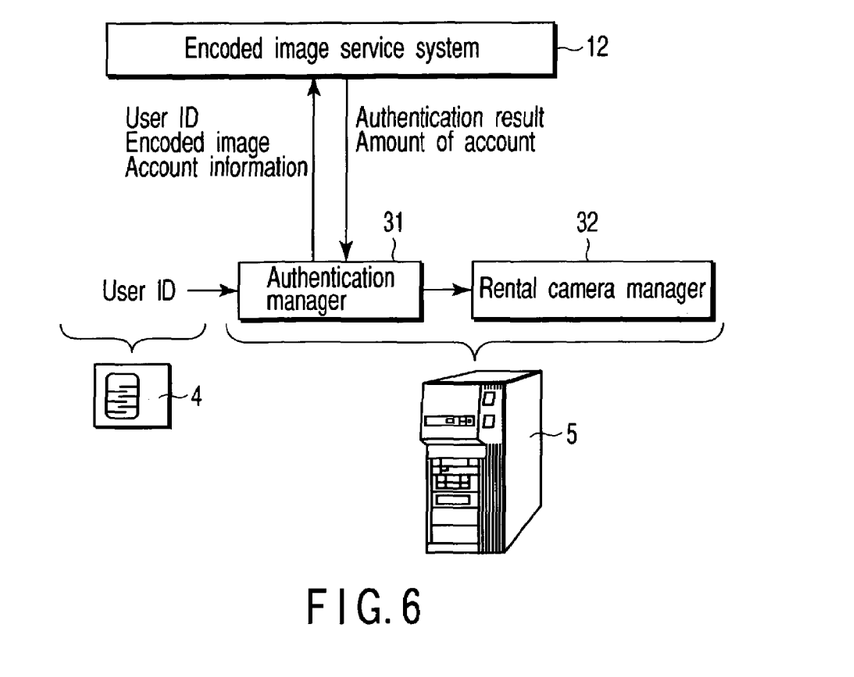
FIG. 6 is a conceptual diagram which shows an authentication/digital camera return/image transmission using the customer authentication communication terminal equipment according to the embodiment of the present invention.

FIG. 6 shows the procedure from the customer authentication to the code image transmission which uses the customer authentication communication terminal equipment 5 after the camera is returned, though FIG. 5 shows the lending procedure of the camera. The encoded image signal is recorded in the ID memory medium 4, when the customer 8 uses the digital camera 3 lent out by the above-mentioned mode and photographs. When the photographing of the schedule is completed, the customer 8 returns the agency the digital camera 3 under the rent. If an easy check of returned the digital camera 3 is performed and the disorder of the digital camera 3 is not found, the agency inputs to lending camera manager 32 the return of the digital camera 3 under the lending. The customer ID information is read from the corresponding ID memory medium 4 when the ID memory medium 4 which is brought by the customer 8 is set in the customer authentication communication terminal equipment 5, and the authentication manager 31 inquires the customer ID information of the encoded image service system 1. Then, the customer authentication result and the latest account data in case of the registered customer are sent from the system 1. When it is confirmed that the customer has been registered, subsequently the encoding image signal is read from the corresponding ID memory medium 4 and is transmitted to the system 1 with account information for the demanded service contents. Then, the latest amount of the account is sent back by the system 1, and the agency transmits the corresponding amount of money to the customer 8. As the collection of the amount of the account, the pull-down from the bank account of the customer 8 and the credit company can be used, of course, the agency may collect it, and when the amount of the account is collected in the scene, the data of the latest amount of money is transmitted and updated to system 1.

The charge system in the service system of this embodiment is calculated based on service use basis charge, the print output unit price, image folder (electronic album) storing unit price up to the predetermined number of scenes, writing unit price to the specified media, the step-by-step postprocessing unit price according to the processing content, and the number of scenes for processing except the tax and the delivery commission. It is preferable that the demand processing content is memorized in the ID memory medium 4 from the viewpoint of the information unification.

As described above, according to the encoding image service system according to the present invention, it is possible to surely charge the customer who has been registered as the user and collect it, and to prevent the photographed image signal of the customer illegally flowing out and being reproduced. Moreover, after completing the photographing, the customer can promptly acquire the non-encoded photographed image signal only by requiring the data communication time of shuttling and the decoding processing time on the personal computer or on the digital camera. The present invention is not limited to the above-mentioned embodiment of the invention. The present invention can be modified within the scope of the invention.

As explained above, according to the present invention, a digital camera which generates an encoded image signal suitable to apply to the rental system and a customer authentication communication terminal equipment and to provide a service system which lends or sells the digital camera to registration customers cheaply, and charges surely according to the amount of use thereof can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An encoded image service system for managing a service for renting a digital camera to a plurality of registered customers, said system comprising:

an identification (ID) generating part for generating customer ID information to identify each of the registered customers;

a first code key generating part for generating for each of the customers, a first code key and a first decode key corresponding to the first code key, wherein the first code key is stored with the corresponding customer ID information in a storage medium which is attachable to the digital camera;

a second code key generating part for generating for each of the customers, a second code key that is different from the first code key and a second decode key corresponding to the second code key;

a code key storing part for storing the first decode key generated in the first code key generating part and the second code key generated in the second code key generating part;

a receipt part configured to receive an encoded electronic image signal, which is encoded using the first code key and has been photographed by the digital camera, that is sent by the registered customer;

a coded image rendering part configured to decode the encoded electronic image signal with the first decode key;

an image encoding part configured to encode the decoded electronic image signal decoded by the coded image rendering part using the second code key; and an image server part configured to perform at least one processing of a print output corresponding to the electronic image signal decoded by the coded image rendering part, and storage and recording of the image signal which is encoded with the second code key, according to a service demand of the customer.

2. The encoded image service system according to claim 1, further comprising a customer manager configured to manage a customer registration to the system and account information corresponding to the registered customer, wherein the customer manager comprises:

an information receipt part configured to receive the customer ID information, the encoded electronic image signal, and service demand information indicating a service demanded by the customer;

an authentication part configured to determine whether the received data corresponds to any registered customer; and an account part configured to charge a use charge to the registered customer in accordance with the service demanded by the customer.

3. The encoded image service system according to claim 2, wherein the customer manager memorizes individual information of the customer.

4. The encoded image service system according to claim 2, wherein the customer manager totals each use charge charged to the registered customer for every predetermined use period.

5. The encoded image service system according to claim 2, wherein the customer manager includes a time part configured to time a required time necessary to execute the demanded service, and the customer manager adds to an account of charges of the registered user a predetermined use amount at each passage of a unit time during execution of the demanded service.

6. The encoded image service system according to claim 2, wherein the customer manager includes a part configured to receive service scene information from the customer, and the customer manager adds to an account of charges of the registered user an amount of a use charge corresponding to a number of service scenes.

7. The encoded image service system according to claim 2, wherein the customer manager includes a part configured to receive the encoded image signal and adds a charge according to a number of scenes in the encoded image signal to an amount of an account of charges to the registered user.

8. A camera rental system comprising:

a digital camera; and an encoded image service system for managing a service for renting the digital camera to a plurality of registered customers;

wherein the encoded image service system comprises:

an identification (ID) generating part configured to generate customer ID information for identifying each of the registered customers;

a first code key generating part for generating for each of the customers, a first code key and a first decode key corresponding to the first code key, wherein the first code key is stored with the corresponding customer ID information in a storage medium which is attachable to the digital camera;

a second code key generating part for generating for each of the customers, a second code key that is different from the first code key and a second decode key corresponding to the second code key;

a code key storing part for storing the first decode key generated in the first code key generating part and the second code key generated in the second code key generating part;

a receipt part configured to receive an encoded electronic image signal, which is encoded using the first code key, that is sent by the registered customer;

a coded image rendering part configured to decode the encoded electronic image signal with the first decode key;

an image encoding part configured to encode the decoded electronic image signal decoded by the coded image rendering part using the second code key; and an image server part configured to perform at least one processing of a print output corresponding to the electronic image signal decoded by the coded image rendering part, and storage and recording of the image signal which is encoded with the second code key, according to a service demand of the customer;

wherein the digital camera comprises:

a storage medium mount part in which the storage medium is mountable, the storage medium storing the first code key and the corresponding customer ID information;

a photoelectric conversion part configured to perform a photoelectric conversion of a field image and output a first image signal;

a first processing part configured to perform a first signal processing of the first image signal and output a second image signal;

an encoding part configured to encode the second image signal with the first code key which is stored in the storage medium and output a third image signal; and a storing part for storing the third image signal in the storage medium.

9. The camera rental system according to claim 8, wherein the encoded image service system further comprises a customer manager configured to manage a customer registration to the system and account information corresponding to the registered customer, wherein the customer manager comprises:

an information receipt part configured to receive the customer ID information, the encoded electronic image signal, and service demand information indicating a service demanded by the customer;

an authentication part configured to determine whether the received data corresponds to any registered customer; and an account part configured to charge a use charge to the registered customer in accordance with the service demanded by the customer.

10. A camera rental system comprising:

a digital camera including a camera body and a nonvolatile storage medium for storing an image, wherein the storage medium is attachable to and detachable from the camera body;

an encoded image service system for managing a service for renting the digital camera to a plurality of registered customers; and a customer authentication communication terminal configured to communicate with the encoded image service system;

wherein the encoded image service system comprises:

an identification (ID) generating part configured to generate customer ID information for identifying each of the registered customers;

a first code key generating part for generating for each of the customers, a first code key and a first decode key corresponding to the first code key;

a second code key generating part for generating for each of the customers, a second code key that is different from the first code key and a second decode key corresponding to the second code key;

a code key storing part for storing the first decode key generated in the first code key generating part and the second code key generated in the second code key generating part;

a medium preparing part configured to store the customer ID information and the first code key in the storage medium;

a receipt part configured to receive an encoded electronic image signal, which is encoded using the first code key, that is sent by the registered customer;

a customer manager configured to manage a customer registration to the system and account information corresponding to the registered customer;

a coded image rendering part configured to decode the encoded electronic image signal with the first decode key;

an image encoding part configured to encode the decoded electronic image signal decoded by the coded image rendering part using the second code key; and an image server part configured to perform at least one processing of a print output corresponding to the electronic image signal decoded by the coded image rendering part, and storage and recording of the image signal which is encoded with the second code key, according to a service demand of the customer;

wherein the digital camera comprises:

a photoelectric conversion part configured to perform a photoelectric conversion of a field image and output a first image signal;

a first processing part configured to perform a first signal processing of the first image signal and output a second image signal;

an encoding part configured to encode the second image signal with the first code key which is stored in the storage medium and output a third image signal; and a storing part for storing the third image signal in the storage medium which stores the customer ID information and the first code key; and wherein the customer authentication communication terminal comprises:

an information receipt part configured to receive the customer ID information, the encoded electronic image signal encoded using the first code key, and service demand information which are at least one of: transmitted via a communication part, and transferred from the storage medium;

a communication part configured to communicate with the encoded image service system; and a customer authentication manager configured to confirm registration of a customer to the system.

11. The camera rental system according to claim 10, wherein the customer authentication communication terminal further comprises a manager configured to manage lending and return information of the digital camera prepared for lending.

12. The camera rental system according to claim 11, wherein the customer authentication communication terminal confirms registration of the customer based on information received from the encoded image service system by the customer authentication manager.

13. The camera rental system according to claim 11, wherein the customer authentication communication terminal displays account information received from the encoded image service system by the customer authentication manager.

* * * * *